United States Patent
Bremser et al.

(10) Patent No.: US 6,946,512 B2
(45) Date of Patent: Sep. 20, 2005

(54) MOLDING MATERIALS AND METHOD FOR PRODUCING MOLDED PARTS

(75) Inventors: Wolfgang Bremser, Münster (DE); Peter Steiner, Sendenhorst (DE); Beate Podlaski-Pyzik, Münster (DE); Frank Strickmann, Steinfurt (DE); Ute Stockbrink, Emsdetten (DE)

(73) Assignee: BASF Coatings AG, Munster (DE)

( * ) Notice: Subject to any disclaimer, the term of this patent is extended or adjusted under 35 U.S.C. 154(b) by 215 days.

(21) Appl. No.: 10/257,119

(22) PCT Filed: Apr. 3, 2001

(86) PCT No.: PCT/EP01/03748
§ 371 (c)(1),
(2), (4) Date: Oct. 8, 2002

(87) PCT Pub. No.: WO01/79307
PCT Pub. Date: Oct. 25, 2001

(65) Prior Publication Data
US 2003/0078337 A1 Apr. 24, 2003

(30) Foreign Application Priority Data
Apr. 12, 2000 (DE) .......................................... 100 18 078

(51) Int. Cl.⁷ ............................................. C08G 63/48
(52) U.S. Cl. .................... 524/502; 264/331.15; 525/64; 525/273; 525/391; 525/204; 525/292.5
(58) Field of Search .................... 524/502; 264/331.15; 525/64, 273, 391, 204, 292.5

(56) References Cited

U.S. PATENT DOCUMENTS

| 3,552,986 A | 1/1971 | Bassemir | 117/12 |
| 3,577,476 A | 5/1971 | Gurney | 260/668 |

(Continued)

FOREIGN PATENT DOCUMENTS

| CA | 2004988 | 6/1990 | C08F/2/24 |
| CA | 2103595 | 8/1992 | C08F/2/38 |
| CA | 2086156 | 6/1993 | C09D/175/04 |
| CA | 2127919 | 3/1995 | C08L/57/00 |
| CA | 2205030 | 5/1996 | C08F/2/38 |
| CA | 2181934 | 1/1997 | C08F/282/00 |
| CA | 2259559 | 1/1998 | C08F/8/34 |
| CA | 2355620 | 7/2000 | C08F/2/38 |
| DE | 35 46 594 | 12/1992 | C08F/212/06 |
| DE | 44 20 917 | 12/1995 | C08F/212/32 |
| DE | 198 58 708 | 6/2000 | C98F/212/32 |
| EP | 3582221 | 9/1989 | C09D/5/44 |
| EP | 401565 | 12/1990 | C09D/5/02 |
| EP | 498583 | 8/1992 | B01J/19/18 |
| EP | 732359 | 9/1996 | C08K/5/00 |
| EP | 755946 | 1/1997 | C08F/2/22 |
| WO | WO9106535 | 5/1991 | C07C/409/16 |
| WO | WO9213903 | 8/1992 | C08F/2/38 |
| WO | WO9222355 | 12/1992 | A63B/37/12 |
| WO | WO9322351 | 11/1993 | C08F/2/42 |
| WO | WO9801478 | 1/1998 | C98F/2/38 |
| WO | WO9837104 | 8/1998 | C08F/2/48 |
| WO | WO9910413 | 3/1999 | C08J/3/00 |
| WO | WO9915597 | 4/1999 | C09D/133/00 |

OTHER PUBLICATIONS

English Language Abstract for DE 198 58 708.
Bartol, et al., U.S. Appl. No. 09/263,426, filed Mar. 5, 1999.
Rink et al., U.S. Appl. No. 09/830,694, filed Apr. 27, 2003.
Meiseuburg, et al., U.S. Appl. No. 09/926,532, filed Nov. 16, 2001.
Mangels, et al., U.S. Appl. No. 10/088,376, filed Mar. 11, 2002.
Nickolaus et al., U.S. Appl. No. 10/250,586, filed Jul. 2, 2003.
Ramesh, et al., U.S. Appl. No. 10/455,066, filed Jun. 5, 2003.
Baumgart, et al., U.S. Appl. No. 10/049,656, filed Feb. 13, 2002.
Rink, et al., U.S. Appl. No. 10/049,607, filed Feb. 14, 2002.
Nickolaus et al., U.S. Appl. No. 10/250,694, filed Jul. 3, 2003.
Bendix et al., U.S. Appl. No. 10/148,428, filed May 29, 2002.
Clauss, U.S. Appl. No. 10/148,295, filed May 29, 2002.
Bremser, U.S. Appl. No. 10/018,703, filed Dec. 13, 2001.
Bremser, U.S. Appl. No. 10/018,352, filed Dec. 7, 2001.
Bremser, U.S. Appl. No. 10/018,350, filed Dec. 7, 2001.
Bendix et al., U.S. Appl. No. 10/148,427, filed May 29, 2002.
Derwent Accession No. 1996–056019, English Abstract for JP07316242.
Derwent Accession No. 1996–094214, English Abstract for JP08003208.

(Continued)

Primary Examiner—William K. Cheung

(57) ABSTRACT

Use of a copolymer (A) preparable by free-radical polymerization of
a) at least one olefinically unsaturated monomer and
b) at least one olefinically unsaturated monomer different than the olefinically unsaturated monomer (a) and of the general formula I $$R^1R^2C=CR^3R^4 \qquad (I),$$

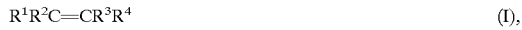

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium for producing molding compounds and moldings.

11 Claims, No Drawings

U.S. PATENT DOCUMENTS

| | | | |
|---|---|---|---|
| 4,085,168 A | 4/1978 | Milkovich et al. | 260/886 |
| 4,413,036 A | 11/1983 | Drexler et al. | 428/458 |
| 4,521,580 A | 6/1985 | Turner et al. | 526/307 |
| 4,533,701 A | 8/1985 | Kusumoto et al. | 525/370 |
| 4,636,545 A | 1/1987 | König et al. | 524/457 |
| 4,656,226 A | 4/1987 | Hutchins et al. | 525/93 |
| 4,677,003 A | 6/1987 | Redlich et al. | 427/373 |
| 5,047,454 A | 9/1991 | Cowles et al. | 523/500 |
| 5,126,393 A | 6/1992 | Blum et al. | 524/538 |
| 5,322,715 A | 6/1994 | Jouck et al. | 427/409 |
| 5,385,996 A | 1/1995 | Rizzardo et al. | 526/240 |
| 5,395,903 A | 3/1995 | Charmot et al. | 526/220 |
| 5,516,559 A | 5/1996 | Röckrath et al. | 427/407 |
| 5,521,229 A | 5/1996 | Lu et al. | 522/40 |
| 5,565,508 A | 10/1996 | Hoenel et al. | 523/414 |
| 5,601,880 A | 2/1997 | Schwarte et al. | 427/407.1 |
| 5,670,557 A | 9/1997 | Dietz et al. | 522/184 |
| 5,773,543 A | 6/1998 | Rizzardo et al. | 526/215 |
| 5,830,927 A | 11/1998 | Vanderhoff et al. | 522/81 |
| 5,830,928 A | 11/1998 | Falerf et al. | 523/502 |
| 5,840,372 A | 11/1998 | Rink et al. | 427/407 |
| 5,854,353 A | 12/1998 | Knoll et al. | 525/314 |
| 5,857,998 A | 1/1999 | Barry | 604/96 |
| 5,859,112 A | 1/1999 | Overbeck et al. | 524/460 |
| 5,905,132 A | 5/1999 | Wegner et al. | 528/45 |
| 5,959,026 A | 9/1999 | Abusleme et al. | 524/758 |
| 5,969,030 A | 10/1999 | Grandhee | 524/457 |
| 5,972,809 A | 10/1999 | Faler et al. | 442/103 |
| 5,990,221 A | 11/1999 | Dames et al. | 524/457 |
| 6,020,438 A | 2/2000 | Lubnin et al. | 525/317 |
| 6,046,259 A | 4/2000 | Das et al. | 524/40 |
| 6,100,350 A | 8/2000 | Wilczek et al. | 526/82 |
| 6,140,386 A | 10/2000 | Vanderhoff et al. | 522/78 |
| 6,160,049 A | 12/2000 | Mathauer et al. | 524/804 |
| 6,162,886 A | 12/2000 | Bremer et al. | 526/318.42 |
| 6,221,949 B1 | 4/2001 | Gross et al. | 524/451 |
| 6,235,857 B1 | 5/2001 | Rizzardo et al. | 526/220 |
| 6,346,591 B1 | 2/2002 | Ohrbom et al. | 526/312 |
| 6,403,709 B2 | 6/2002 | Ramesh et al. | 525/95 |
| 6,462,139 B1 | 10/2002 | Das et al. | |
| 6,503,983 B1 | 1/2003 | Morrison et al. | 524/804 |
| 6,506,836 B1 | 1/2003 | Bremser et al. | 525/64 |
| 6,512,026 B1 | 1/2003 | Ott et al. | |
| 6,534,588 B1 | 3/2003 | Löcken et al. | 524/591 |
| 6,566,476 B2 | 5/2003 | Ohrbom et al. | 526/312 |
| 6,670,043 B2 | 12/2003 | Barkac et al. | |
| 2002/0035289 A1 | 3/2002 | Walter et al. | 560/157 |
| 2002/0086966 A1 | 7/2002 | Weise et al. | 526/312 |
| 2002/0103319 A1 | 8/2002 | Ohrbom et al. | 526/312 |
| 2002/0132921 A1 | 9/2002 | Ramesh et al. | 525/88 |
| 2003/0078337 A1 | 4/2003 | Bremser et al. | 524/502 |
| 2003/0091832 A1 | 5/2003 | Ohrbom et al. | 428/423.1 |
| 2003/0100673 A1 | 5/2003 | Bendix et al. | 524/801 |
| 2003/0143414 A1 | 7/2003 | Bendix et al. | 428/500 |

OTHER PUBLICATIONS

Derwent Accession No. 1986–152526, English Abstract for Nippon, JP61085417.

English Abstract for, Dalibor, DE 3546594, filed Dec. 10, 1987.

English Abstract for Grutter, EP 358 221, filed Mar. 14, 1990.

English Abstract for Knoll, et al., EP 732 359, filed Sep. 18, 1996.

Bremser, U.S. Appl. No. 10/018,351, filed Dec. 7, 2001.

Derwent Accession No. 1999–502399, English Abstract for JP11217409, Aug. 16, 1999.

MOLDING MATERIALS AND METHOD FOR PRODUCING MOLDED PARTS

This application is National Phase Application of Patent Application PCT/EP01/3748 filed on 03, Apr. 2001.

The present invention relates to the novel use of a copolymer and of its aqueous dispersion for producing molding compounds and moldings. The present invention further relates to novel aqueous molding compounds and their use for producing moldings. Not least, the present invention relates to a novel process for producing moldings.

Processes for producing moldings by curing liquid molding compounds in a mold and removal of the mold after curing are known per se. Examples of such processes are the production of cast metal pieces such as bells by solidifying a metal melt in a suitable solid mold, the injection molding of plastics moldings using melted thermoplastics, the RIM (reaction injection molding) process, in which at least two starting materials for polyurethanes, which are reactive with one another, are injected into a mold and cured therein, processes where molding compounds based on olefinically unsaturated monomers such as methyl methacrylate are heat-cured in a mold, or processes where molding compounds based on styrene and UV-curable and/or heat-curable polymers such as polyesters are used.

One disadvantage of these processes is the high energy consumption required to melt the metals and the thermoplastics. Another is the high level of expenditure on apparatus necessitated by the high process temperatures and/or pressures. A disadvantage of the other processes is the use of highly reactive organic starting materials whose handling presents safety and environmental problems. In all cases, the materials of the molds are required to meet stringent requirements in terms of temperature and pressure stability and of chemical resistance in order not to be damaged or destroyed by the molding compounds.

The German patent application bearing the file reference DE 199 30 067.4, unpublished at the priority date of the present specification, describes the use of a copolymer (A) preparable by free-radical polymerization of
a) at least one olefinically unsaturated monomer and
b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium in a coating material which is used to produce surfacer coats and antistonechip primers. The production of the surfacers and primers from the coating materials requires temperatures above 100° C. There are no references therein to the use of copolymers (A) for producing molding compounds and moldings.

It is an object of the present invention to provide a new molding compound which no longer has the disadvantages of the prior art but which instead permits the production of moldings without special safety measures, and at atmospheric pressure and low temperatures, in particular at room temperature. The molding compound should be aqueous and should consist essentially of constituents which are easy to prepare and can be stored, handled and processed without safety or environmental problems. In particular, the new molding compounds should permit the use, inter alia, of molds made from inexpensive and/or not especially thermally and/or chemically stable materials such as plastics, rubber, wood, paper, textile or leather, thereby making it possible, inter alia, to produce impressions of items made from such materials.

Accordingly we have found the novel use of a copolymer (A) preparable by free-radical polymerization of
a) at least one olefinically unsaturated monomer and
b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium for producing molding compounds and moldings.

In the text below, the novel use of the copolymer (A) is referred to as "use in accordance with the invention".

We have also found the novel aqueous molding compound which comprises
(A) the aqueous dispersion of at least one copolymer (A) preparable by free-radical (co)polymerization of
a) at least one olefinically unsaturated monomer having at least one functional group which is reactive toward amino resin, and
b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
and
(B) at least one amino resin, which is referred to below as "molding compound of the invention".

We have also found, moreover, the novel process for producing moldings by curing liquid molding compounds in a mold and removing the mold, wherein a molding compound comprising
(A) the aqueous dispersion of at least one copolymer (A) preparable by free-radical (co)polymerization of
a) at least one olefinically unsaturated monomer having at least one functional group which is reactive toward amino resin, and b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;

and (B) at least one amino resin, is used, which process is referred to below as "process" of the invention".

Not least we have found novel moldings which are produced from the molding compounds of the invention and/or by the process of the invention. In the text below, they are referred to as "moldings of the invention".

In the light of the prior art it was surprising and unforeseeable to the skilled worker that the object on which the present invention was based could be solved with the aid of the use in accordance with the invention. This was all the more surprising since heat-curable substances, such as heat-curable coating materials based on amino resins, for example, must usually be cured at temperatures above 100° C. in order to provide fully cured, thermoset coatings within a short process time.

In the context of the present invention, the term "moldings of the invention" embraces moldings obtained by the casting of molding compounds in molds or by the embedding of articles in molding compounds. The latter are also referred to as impressions.

The first essential constituent of the molding compound of the invention is at least one copolymer (A). In accordance with the invention, the copolymer (A) is prepared by free-radical (co)polymerization of at least one olefinically unsaturated monomer (a) and at least one olefinically unsaturated monomer (b) different than the monomer (a).

Suitable monomers (a) include a very wide variety of olefinically unsaturated monomers. In accordance with the invention it is of advantage to use at least one monomer (a) having at least one, in particular one, functional group reactive toward amino resin. Examples of suitable functional groups reactive toward amino resin are thio, hydroxyl, amino, N-methylolamino, N-alkoxymethylamino, imino, carbamate and/or allophanate groups, especially hydroxyl groups.

Examples of suitable monomers (a) are the monomers (al) such as hydroxyalkyl esters of acrylic acid, methacrylic acid or another alpha,beta-olefinically unsaturated carboxylic acid which are derived from an alkylene glycol which is esterified with the acid or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl and 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone, for example, and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, in particular of a Versatic® acid, or instead of the reaction product an equivalent amount of acrylic and/or methacrylic acid, which is then reacted during or after the polymerization reaction with the glycidyl ester of an alpha-branched monocarboxylic acid having 5 to 18 carbon atoms per molecule, in particular of a Versatic® acid;

aminoethyl acrylate, aminoethyl methacrylate, allyl amine or N-methyliminoethyl acrylate;

N,N-di(methoxymethyl)aminoethyl acrylate or methacrylate or N,N-di(butoxymethyl)aminopropyl acrylate or methacrylate;

(meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)-(meth)acrylamide;

acryloyloxy- or methacryloyloxyethyl, propyl or butyl carbamate or allophanate; further examples of suitable monomers containing carbamate groups are described in the patents U.S. Pat. No. 3,479,328, U.S. Pat. No. 3,674,838, U.S. Pat. No. 4,126,747, U.S. Pat. No. 4,279,833 or U.S. Pat. No. 4,340,497.

Monomers (a1) of relatively high functionality are used generally in minor amounts. In the context of the present invention, minor amounts of higher-functional monomers are those amounts which do not lead to crosslinking or gelling of the copolymers unless the deliberate intention is to produce crosslinked polymeric microparticles.

The monomers (a1) may be used as the sole monomers. In accordance with the invention, however, it is of advantage to use further olefinically unsaturated monomers (a) as well in order to vary the profile of properties of the copolymers (A) for use in accordance with the invention in an advantageous manner and to tailor it to the particular intended use of the molding compound.

Examples of suitable further monomers (a) are (a2) (meth)acrylic esters which are essentially free of acid groups, such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4, 7-methano-1H-indenemethanol or tert-butylcyclohexyl (meth)acrylate; (meth)acrylic oxaalkyl esters or oxacycloalkyl esters, such as ethyltriglycol (meth)acrylate and methoxyoligoglycol (meth)acrylate having a molecular weight Mn of preferably 550, or other ethoxylated and/or propoxylated, hydroxyl-free (meth)acrylic acid derivatives. These monomers may include, in minor amounts, higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylolpropane di- or tri(meth) acrylate; or pentaerythritol di-, tri- or tetra(meth)acrylate. With regard to the higher-functional monomers (a2), the comments made above apply.

(a3) Monomers which carry per molecule at least one acid group that can be converted to the corresponding acid anion group, such as acrylic acid, methacrylic acid, ethacrylic acid, crotonic acid, maleic acid, fumaric acid, itaconic acid, alpha-methylvinylbenzoic acid (all isomers), or vinylbenzoic acid (all isomers); olefinically unsaturated sulfonic or phosphonic acids or their partial esters, such as p-vinylbenzenesulfonic acid; or mono (meth)acryloyloxyethyl maleate, succinate or phthalate.

(a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as petroleum fractions, and may comprise both branched and straight-chain acyclic and/or cycloaliphatic olefins. The reaction of such olefins with formic acid, or with carbon monoxide and water, produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters (a4) may be prepared in a manner known per se from the acids, for example, by reacting the acid with acetylene. Particular preference is given, owing to their ready availability, to the use of vinyl esters of saturated aliphatic monocarboxylic acids having 9 to 11 carbon atoms that are branched on the alpha carbon atom, especially Versatic® acids.

(a5) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopenta-diene.

(a6) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl- and/or N,N-cyclohexylmethyl-(meth) acrylamide.

(a7) Monomers containing epoxide groups, such as the glycidyl ester of acrylic acid, methacrylic acid, ethacrylic acid, crotonic acid, maleic acid, fumaric acid and/or itaconic acid, or allyl glycidyl ether.

(a8) Vinyl aromatic hydrocarbons such as styrene, alpha-alkylstyrenes, especially alpha-methyl-styrene and/or vinyltoluene, N,N-diethylamino-styrene (all isomers) and/or N,N-diethylamino-alpha-methylstyrene (all isomers).

(a9) Nitriles such as acrylonitrile and/or methacrylo-nitrile.

(a10) Vinyl compounds, especially vinyl halides and/or vinylidene dihalides such as vinyl chloride, vinyl fluoride, vinylidene dichloride or vinylidene difluoride; N-vinyl amides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

(a11) Allyl compounds, especially allyl ethers and allyl esters such as allyl methyl, ethyl, propyl or butyl ether or allyl acetate, propionate or butyrate.

(a12) Polysiloxane macromonomers which have a number-average molecular weight Mn of from 1000 to 40,000 and contain on average from 0.5 to 2.5 ethylenically unsaturated double bonds per molecule; especially polysiloxane macromonomers having a number-average molecular weight Mn of from 2000 to 20,000, with particular preference from 2500 to 10,000, and in particular from 3000 to 7000, and containing on average from 0.5 to 2.5, preferably from 0.5 to 1.5, ethylenically unsaturated double bonds per molecule, as are described in DE-A-38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823, or in the International Patent Application WO 92/22615 on page 12, line 18 to page 18, line 10.

(a13) Acryloxysilane-containing vinyl monomers, preparable by reacting hydroxy-functional silanes with epichlorohydrin and then reacting the reaction product with (meth)acrylic acid and/or hydroxyalkyl and/or hydroxycycloalkyl esters of (meth)acrylic acid (cf. monomers a3).

In accordance with the invention, very particular advantages result if the monomers (a2) and/or (a3) are used as additional monomers (a).

In accordance with the invention, compounds of the general formula I are used as monomers (b).

In the general formula I the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1, 3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or biphenylyl, preferably phenyl and naphthyl, and especially phenyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The above-described radicals $R^1$, $R^2$, $R^3$ and $R^4$ may be substituted. For this purpose, electron withdrawing or electron donating atoms or organic radicals may be used.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N-dicyclohexylamino, N-cyclohexyl-N-methylamino or N-ethyl-N-methylamino.

Examples of monomers (b) used with particular preference in accordance with the invention are diphenylethylene, dinaphthaleneethylene, cis- or trans-stilbene, vinylidenebis (4-N,N-dimethylaminobenzene), vinylidenebis(4-aminobenzene) or vinylidenebis(4-nitrobenzene).

In accordance with the invention, the monomers (b) may be used individually or as a mixture of at least two monomers (b).

In terms of the reaction regime and of the properties of the resultant copolymers (A), especially of the acrylate copolymers (A), diphenylethylene is of very particular advantage and is therefore used with very particular preference in accordance with the invention.

The monomers (a) and (b) for use in accordance with the invention are reacted with one another in the presence of at least one free-radical initiator to give the copolymer (A). Examples of initiators which may be used include: dialkyl peroxides, such as di-tert-butyl peroxide or dicumyl peroxide; hydroperoxides, such as cumene hydroperoxide or tert-butyl hydroperoxide; per esters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azo dinitriles such as azobisisobutyronitrile; C—C-cleaving initiators such as benzpinacol silyl ether; or a combination of a nonoxidizing initiator with hydrogen peroxide.

It is preferred to add comparatively large amounts of free-radical initiator, the proportion of the initiator in the reaction mixture, based in each case on the overall amount of the monomers (a) and of the initiator, being with particular preference from 0.5 to 50% by weight, with very particular preference from 1 to 20% by weight, and in particular 2 to 15% by weight.

The weight ratio of initiator to the monomers (b) is preferably from 4:1 to 1:4, with particular preference from 3:1 to 1:3, and in particular from 2:1 to 1:2. Further advantages result if the initiator is used in an excess within the stated limits.

Preferably, the free-radical copolymerization is conducted in suitable apparatuses, especially stirred vessels or Taylor reactors, the Taylor reactors being designed such that the conditions of Taylor flow are met over the entire reactor length, even if the kinematic viscosity of the reaction medium alters greatly, and in particular increases, owing to the copolymerization.

In accordance with the invention, the copolymerization is conducted in an aqueous medium.

The aqueous medium comprises essentially water. Said aqueous medium may comprise in minor amounts the additives (C) described in detail below and/or other dissolved solid, liquid or gaseous organic and/or inorganic substances of low and/or high molecular mass, especially surface-active substances, provided these do not adversely affect, or even inhibit, the copolymerization. In the context of the present invention, the term "minor amount" means an amount which does not overturn the aqueous nature of the aqueous medium.

Alternatively, the aqueous medium may comprise just water.

Preferably, the copolymerization is conducted in the presence of at least one base. Particular preference is given to low molecular mass bases such as sodium hydroxide, potassium hydroxide, ammonia, diethanolamine, triethanolamine, mono-, di- and triethylamine, and/or dimethylethanolamine, especially ammonia and/or di- and/or triethanolamine.

The copolymerization is advantageously conducted at temperatures above room temperature and below the lowest decomposition temperature of the particular monomers used, with the chosen temperature range being preferably from 10 to 150° C., with very particular preference from 70 to 120° C., and in particular from 80 to 110° C.

When using particularly volatile monomers (a) and/or (b) the copolymerization may also be conducted under pressure, preferably under from 1.5 to 3000 bar, with particular preference from 5 to 1500 bar, and in particular from 10 to 1000 bar.

In terms of the molecular weight distribution, the copolymer (A) is not subject to any restrictions. Advantageously, however, the copolymerization is conducted so as to give a molecular weight distribution Mw/Mn, measured by gel permeation chromatography using polystyrene as standard, of $\leq 4$, with particular preference $\leq 2$, and in particular $\leq 1.5$, and in certain cases even $\leq 1.3$. The molecular weights of the copolymers (A) can be controlled within wide limits by the choice of the ratio of monomer (a) to monomer (b) to free-radical initiator. In this context, the molecular weight is determined in particular by the amount of monomer (b), specifically such that the higher the proportion of monomer (b), the lower the resulting molecular weight.

The copolymer (A) resulting from the copolymerization is produced as a mixture with the aqueous medium, generally in the form of a dispersion (A). Its solids content may vary very widely; it is preferably from 5 to 60, more preferably from 10 to 55, with particular preference from 15 to 50, with very particular preference from 20 to 45, and in particular from 25 to 40, % by weight, based in each case on the dispersion (A).

The dispersion (A) can be used directly to produce the molding compounds and moldings of the invention. In accordance with the invention, however, it is of advantage to use the dispersion (A) and/or the copolymer (A) present therein as a macroinitiator for the further reaction with at least one further monomer (a) in a second stage (ii).

The further reaction in accordance with the stage (ii) is preferably conducted under the customary conditions for a free-radical polymerization, in which appropriate additives (C) may be present. The stages (i) and (ii) may be conducted separately from one another both spatially and temporally. Furthermore, however, the stages (i) and (ii) may also be conducted in succession in one reactor. For this purpose, first of all the monomer (b) is reacted fully or partly with at least one monomer (a), depending on the desired application and properties, after which at least one further monomer (a) is added and the mixture is subjected to free-radical polymerization. In another embodiment, at least two monomers (a) are used from the start, the monomer (b) reacting first of all with one of the at least two monomers (a) and then the resultant reaction product (A) reacting, above a certain molecular weight, with the other monomer (a) as well.

Depending on reaction regime, it is possible in accordance with the invention to prepare endgroup-functionalized polymers, block or multiblock and gradient (co)polymers, star polymers, graft copolymers, and branched (co)polymers as copolymers (A).

Copolymers (A) prepared in the multistage procedure described above provide particularly advantageous dispersions (A), molding compounds and moldings, and so are used with particular preference in accordance with the invention.

The solids content of the dispersions (A) prepared in a multistage procedure may also vary very widely; it is preferably from 10 to 70, more preferably from 15 to 65, with particular preference from 20 to 60, with very particular preference from 25 to 55, and in particular from 30 to 50, % by weight, based in each case on the dispersion (A).

The amount of the copolymers (A), prepared in a single-stage or a multistage procedure, in the molding compound of the invention may likewise vary very widely and is guided by the requirements of the individual case. The amount is preferably from 5 to 60, more preferably from 10 to 55, with particular preference from 15 to 50, with very particular preference from 20 to 45, and in particular from 25 to 40, % by weight, based in each case on the molding compound of the invention.

The second essential constituent of the molding compound of the invention is at least one amino resin (B). In this case it is possible to use any amino resin suitable for heat-curable coating materials, or a mixture of such amino resins. In particular it is possible to use melamine resins, guanamine resins, benzoguanamine resins, or urea resins, especially melamine resins. For further details reference is made to Römpp Lexikon Lacke und Druckfarben, Georg Thieme Verlag, 1998, page 29, "Amino resins", and the textbook "Lackadditive" by Johan Bieleman, Wiley-VCH, Weinheim, N.Y., 1998, pages 242 ff., or the book "Paints, Coatings and Solvents", second, completely revised edition, eds. D. Stoye and W. Freitag, Wiley-VCH, Weinheim, N.Y., 1998, pages 80 ff. Further suitable amino resins are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP-B-0 245 700 and the article by B. Singh and coworkers, "Carbamylmethylated melamines, novel crosslinkers for the coatings industry" in Advanced Organic Coatings Science and Technology Series, 1991, volume 13, pages 193 to 207.

The amount of amino resins (B) in the molding compounds of the invention may also vary very widely. It is guided in particular by the number and reactivity of the copolymer (A) functional groups reactive toward amino resin that are present in the molding compound of the invention. The amount is preferably from 1 to 40, more preferably from 2 to 35, with particular preference from 3 to 30, with very particular preference from 4 to 25, and in particular from 5 to 20, % by weight, based in each case on the molding compound of the invention.

Furthermore, the molding compound of the invention may comprise at least one customary and known additive (C) in the effective amounts which are known and customary in each case.

As additive (C) it is preferred to use at least one color and/or effect pigment (C), which may be added to the dispersions (A) before, during or after, in particular after, the preparation of the copolymers (A).

The pigments (C) may comprise organic or inorganic compounds. Because of this large number of suitable pigments (C), the molding compound of the invention ensures a universal breadth of utility and makes it possible to realize a large number of color shades and optical effects.

Effect pigments (C) which may be used are metal flake pigments such as commercial aluminum bronzes, aluminum bronzes chromated in accordance with DE-A-36 36 183, commercial stainless steel bronzes, and metallic and nonmetallic effect pigments, such as pearlescent pigments and interference pigments, for example. For further details, reference is made to Römpp Lexikon Lacke und Druckfarben, Georg Thieme Verlag, 1998, page 176, "Effect pigments", and pages 380 and 381 "Metal oxide-mica pigments" to "metal pigments".

Examples of suitable inorganic color pigments (C) are titanium dioxide, iron oxides, and carbon black. Examples of suitable organic color pigments are thioindigo pigments, indanthrene blue, Irgalith Blue, Heliogen Blue, Irgazine Blue, Palomar Blue, Cromophthal Red, Pigment Laser Red T3, Hostaperm Pink, Irgazine Orange, Sicotrans Yellow, Sicotan Yellow, Hostaperm Yellow, Paliotan Yellow, and Heliogen Green. For further details, reference is made to Römpp Lexikon Lacke und Druckfarben, Georg Thieme Verlag, 1998, pages 180 and 181, "Iron Blue pigments" to "black iron oxide", pages 451 to 453, "Pigments" to "pigment volume concentration", page 563 "Thioindigo pigments", and page 567 "Titanium dioxide pigments".

In addition to or instead of the pigments (C) the molding compound of the invention may further comprise organic and inorganic fillers (C) with which it is possible to vary, for example, the hardness and/or color shade of the moldings of the invention.

Examples of suitable organic and inorganic fillers (C) are chalk, calcium sulfates, barium sulfate, silicates such as talc or kaolin, silicas, oxides such as aluminum hydroxide or magnesium hydroxide, nanoparticles, or organic fillers such as textile fibers, cellulose fibers, polyethylene fibers, polyacrylonitrile powders, polyamide powders, or wood flour. For further details, reference is made to Römpp Lexikon Lacke und Druckfarben, Georg Thieme Verlag, 1998, pages 250 ff., "Fillers". Further examples of suitable fillers (C) are disclosed by German Patent Application DE 196 06 706 A1, column 8, lines 30 to 64. They are preferably used in the amounts specified therein.

The proportion of the pigments (C), including the fillers (C), in the molding compounds of the invention may vary very widely and is guided by the requirements of each individual case, in particular by the optical effect to be established and/or the hiding power of the pigments and/or fillers (C) used in each case. The amount is preferably from 0.5 to 80, more preferably from 0.8 to 75, with particular preference from 1.0 to 70, with very particular preference from 1.2 to 65, and in particular from 1.3 to 60, % by weight, based in each case on the solids content of the molding compound of the invention.

In addition to the pigments and/or fillers (C), the molding compound of the invention may further comprise at least one additive (C) selected from the group consisting of oligomeric and polymeric binders, reactive diluents curable thermally and/or with actinic radiation, other crosslinking agents for thermal curing, low-boiling and high-boiling organic solvents ("long solvents"), UV absorbers, light stabilizers, free-radical scavengers, thermally labile free-radical initiators, catalysts for thermal crosslinking, devolatilizers, slip additives, polymerization inhibitors, defoamers, emulsifiers, wetting agents and dispersants, adhesion promoters, leveling agents, film-forming auxiliaries, rheology control additives (thickeners), flame retardants, siccatives, dryers, antiskinning agents, corrosion inhibitors, waxes, and flatting agents.

Further examples of suitable additives (C) are described in detail in the textbook "Lackadditive" by Johan Bieleman, Wiley—VCH, Weinheim, N.Y., 1998.

The preparation of the molding compound of the invention has no special features but instead takes place preferably by mixing and homogenizing the dispersions (A) with the amino resins (B) and, if appropriate, the additives (C) in suitable mixing equipment such as stirred vessels, stirred mills, Ultra-Turrax, in-line dissolvers, static mixers, toothed wheel dispersers, expansion nozzles and/or microfluidizers.

The resultant molding compounds of the invention are preferably poured into the molds immediately following their preparation, the handling of the molding compounds requiring no special precautionary measures.

The molds may comprise any materials preferably not attacked by water or by aqueous media. Examples of suitable materials are heat-stable substances, such as metals, glass, ceramic, natural minerals, concrete or cement, or comparatively thermally labile materials such as plastics, rubber, leather, wood, textiles or paper. Consequently, it is also possible in a simple manner to obtain impressions of articles or moldings from molds which consist of or comprise these comparatively temperature-sensitive materials.

Examples of suitable molds or articles include virtually all industrial articles or articles of daily use, of comparatively simple form such as sphere, cone, cylinder, cube or strip through to highly complex three-dimensional forms.

The production of the moldings of the invention also has no special features in terms of its method but instead takes place by casting the molding compounds of the invention in molds or by embedding articles in the molding compounds of the invention. If desired, a customary and known, water-resistant anti-adhesion layer or release layer of, for example, wax, silicone, or silicone-coated paper or plastic may be present between the molds or articles and the molding compound.

Subsequently, the molding compounds of the invention may be cured in direct or indirect contact with the molds or articles. Curing may be accelerated by means of elevated temperature, reduced atmospheric humidity, and/or actinic radiation such as near infrared, visible light, UV radiation or electron beams. Preferably, curing takes place without the additional measures and at room temperature.

The duration of curing may vary very widely depending on composition and may amount to from 20 s to several days.

After curing, the moldings of the invention are released without problems from the molds or articles.

Depending on the water content of the original molding compounds of the invention, on the one hand, and on the water content of the medium surrounding them (for example, atmospheric humidity), the moldings of the invention may give off the water present in them over the course of time—for example, several days. Although in this case the moldings may shrink by the volume of the water given off, there is nevertheless, surprisingly, no incidence of stress cracking or other deformation, so that the moldings of the invention represent a copy of the molds or of the articles which although it may be reduced in size is still true to scale.

EXAMPLES

Preparation Example 1
The Preparation of a Dispersion of a Copolymer (A)

A steel reactor as commonly used for preparing dispersions, equipped with a stirrer, a reflux condenser and three feed vessels, was charged with 52.563 parts by weight of DI water and this initial charge was heated to 90° C. 10.182 parts by weight of acrylic acid, 18.345 parts by weight of methyl methacrylate and 1.493 parts by weight of diphenylethylene were charged to the first feed vessel. 9.914 parts by weight of 25 percent strength ammonia solution were charged to the second feed vessel. 5.25 parts by weight of DI water and 2.253 parts by weight of ammonium peroxodisulfate were charged to the third feed vessel. With intensive stirring of the initial charge in the steel reactor, the three feeds were commenced simultaneously. The first and second feeds were metered in over the course of one hour. The third feed was metered in over the course of 1.25 hours. The resultant reaction mixture was held at 90° C. for four hours and then cooled to below 40° C. and filtered through a 100 μm GAF bag. The resultant dispersion had a solids content of from 32 to 34% by weight (1 hour, 130° C.) and a free monomer content of less than 0.2% by weight (determined by gas chromatography).

The dispersion (A) was used to prepare a block copolymer (A).

Preparation Example 2
The Preparation of a Dispersion of a Block Polymer (A)

A steel reactor as commonly used for preparing dispersions, equipped with a stirrer, a reflux condenser and one feed vessel, was charged with 51.617 parts by weight of DI water and 9.907 parts by weight of the dispersion (A) from Preparation Example 1, and this initial charge was heated to 90° C. with stirring. Thereafter, a mixture of 9.856 parts by weight of n-butyl methacrylate, 7.884 parts by weight of styrene, 12.661 parts by weight of hydroxyethyl methacrylate and 8.885 parts by weight of ethylhexyl methacrylate was metered from the feed vessel over the course of six hours. The resultant reaction mixture was stirred at 90° C. for two hours. Subsequently, the resultant dispersion was cooled to below 40° C. and filtered through a 50 μm GAF bag. The dispersion (A) had a solids content of from 41 to 42% by weight (1 hour, 130° C.) and a free monomer content of less than 0.2% by weight (determined by gas chromatography).

Examples 1 to 3
The Preparation of Molding Compounds of the Invention and the Production of Moldings Therefrom The dispersion (A) from Preparation Example 2, a melamine resin and a commercial defoamer, and, in the case of Example 3, a pigment, were mixed and homogenized with intensive stirring. The table gives an overview of the constituents used and their amounts. Directly following their preparation, the molding compounds of the invention of Examples 1 to 3 were cast into customary and known, downward-hanging, dimensionally stable laboratory rubber gloves and left to cure for 2 days in the case of Examples 1 and 3 and for 3 minutes in the case of Example 2. After curing, the gloves were cut open and the hand-shaped moldings were removed. They represented true-to-detail copies of the original internal volume of the laboratory gloves, which shrank slightly over time without cracking or other deformations. On the basis of their planar standing surface, the "hands" could be used for decoration.

TABLE

Composition of the molding compounds of the invention of Examples 1 to 3

| Constituent | Parts by weight - examples: | | |
|---|---|---|---|
| | 1 | 2 | 3 |
| Dispersion (A) | 89.7 | 86.7 | 83.7 |
| Luwipal ® LR 8839[a] | 13 | — | 13 |

TABLE-continued

Composition of the molding compounds of the invention of Examples 1 to 3

| Constituent | Parts by weight - examples: | | |
|---|---|---|---|
| | 1 | 2 | 3 |
| Cymel ® 301[b] | — | 13 | — |
| Agitan ® 281[c] | 0.3 | 0.3 | 0.3 |
| Pigment Laser Red T3[d] | — | — | 3 |

[a] Melamine resin from BASF Aktiengesellschaft;
[b] Melamine resin from Cytec Specialty Resins A.S.;
[c] Defoamer from Münzing;
[d] Commercial product from Swada, London, Great Britain.

What is claimed is:

1. A liquid aqueous molding compound, comprising a copolymer (A) prepared by free-radical polymerization of
   a) at least one olefinically unsaturated monomer and
   b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals;
   in an aqueous medium.

2. The liquid aqueous molding compound of claim 1, wherein the monomer (a) comprises at least one functional group reactive toward amino resin.

3. An aqueous molding compound comprising
   (A) the aqueous dispersion of at least one copolymer (A) prepared by free-radical (co)polymerization of
      a) at least one olefinically unsaturated monomer having at least one functional group which is reactive toward amino resin, and
      b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcyclolkyl radicals;
   and
   (B) at least one amino resin.

4. A process for producing moldings comprising curing a liquid molding compound in a mold and removing the mold, wherein the liquid molding compound comprises
   (A) the aqueous dispersion of at least one copolymer (A) prepared by free-radical (co)polymerization of
      a) at least one olefinically unsaturated monomer having at least one functional group which is reactive toward amino resin, and
      b) at least one olefinically unsaturated monomer different than the olefinically unsaturated monomer (a) and of the general formula I $$R^1R^2C=CR^3R^4 \qquad (I),$$

in which the radicals $R^1$, $R^2$, $R^3$ and $R^4$, in each case independently of one another, are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals;
   and
   (B) at least one amino resin.

5. The process of claim 4, wherein the copolymer (A) is obtained by
   (i) subjecting at least one monomer (a) and at least one monomer (b) to free-radical polymerization in an aqueous medium, after which
   (ii) the resultant reaction product is reacted with at least one further monomer (a) under free-radical conditions.

6. The process of claim 4, wherein the aryl radicals $R^1$, $R^2$, $R^3$ and/or $R^4$ of the compound (b) are phenyl or naphthyl radicals.

7. The process of claim 4, wherein the substituents in the radicals $R^1$, $R^2$, $R^3$ and/or $R^4$ of the compound (b) are electron withdrawing or electron donating atoms or organic radicals.

8. The process of claim 4, wherein the liquid molding compound further comprises at least one additive (C).

9. The process of claim 8, wherein at least one color and/or effect pigment is used as additive (C).

10. A molding produced by the process as claimed in claim 4.

11. The process of claim 7, wherein the substituents in the radicals $R^1$, $R^2$, $R^3$ and/or $R^4$ of the compound (b) are selected from the group consisting of halogen atoms, nitrile groups, nitro groups, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; arylthio, alkylthio and cycloalkylthio radicals; hydroxyl groups; and/or primary, secondary and/or tertiary amino groups; and mixtures thereof.

* * * * *